Dec. 8, 1959

J. MOLYNEUX 2,915,913

LEADSCREW LOCKING DEVICES

Filed March 24, 1958

Inventor:
John Molyneux
By
Stevens, Davis, Miller & Mosher
Attorneys

Dec. 8, 1959  J. MOLYNEUX  2,915,913
LEADSCREW LOCKING DEVICES
Filed March 24, 1958  4 Sheets-Sheet 3

Dec. 8, 1959    J. MOLYNEUX    2,915,913
LEADSCREW LOCKING DEVICES
Filed March 24, 1958    4 Sheets-Sheet 4

United States Patent Office 2,915,913
Patented Dec. 8, 1959

2,915,913

LEADSCREW LOCKING DEVICES

John Molyneux, Liverpool, England, assignor to The English Electric Company Limited, Lancashire, England, a British company Application March 24, 1958, Serial No. 723,297

Claims priority, application Great Britain April 3, 1957

14 Claims. (Cl. 74—424.8)

This invention relates to leadscrew devices which have provision for locking the co-operating screw threaded members with respect to one another. Such a leadscrew device may, for example, be a screw jack whose function is to elevate or lower a movable structure and retain it in a preselected position. One application, to be described, relates to the use of the device in electrical switchgear in which case provision for certain interlocking connections between the leadscrew and the actuating mechanism of the switch are desirable.

Leadscrew devices operate to adjust the relative position between two co-operating screw threaded members, the adjustment being one of axial position along the axis of the screw threads. The locking may be effected by forcibly and directly restraining the members from relative axial movement. This may be done, for example, by bolting a member driven by a leadscrew to a structure which axially locates a co-operating screw nut. A disadvantage of this form of locking is that the full mechanical advantage of the system is effective against the locking restraint, and consequently in many applications of such a form of leadscrew locking a heavy design is required to prevent any attempt to operate the leadscrew from distorting its parent structure. The locking restraint can be smaller if locking is achieved by preventing the leadscrew from rotating: the lock is then not subjected to the leadscrew operating forces as amplified by the mechanical advantage of the system.

A difficulty arises where it is required to lock the leadscrew in a definite predetermined position. In such a situation the lock may comprise a movable peg mounted in a fixed structure and which, when a hole in the leadscrew is in register with it, can be caused to project into the hole in the leadscrew and so restrain it from rotation. With such a locking device the leadscrew can be locked in any one of a series of discrete positions that are separated by a distance equal to the pitch of the screw thread. If locking in only predetermined select ones of these positions is to be allowable or if locking in such a position has to be automatic an interlocking function must needs be performed and the mechanism for performing this function will need to be responsive to the number of revolutions made by the leadscrew from a fixed datum.

The object of this invention is to provide a new and simple leadscrew device having a locking feature by which locking in only predetermined positions is allowable and can, if certain features of the invention are used, be achieved automatically.

According to one aspect of the invention, a position locking leadscrew device comprises a leadscrew, a co-operating screw nut threaded on the leadscrew, a structure in which one of these members is rotatably mounted and by which the other is restrained from rotation, a position locating member carried by the screw nut and formed by a movable tongue which is admitted to a mating hole in the leadscrew when this hole comes into register with the tongue but which can ride out of the hole when there is angular movement between the leadscrew and the nut, and a lock control link member mounted in said structure and carrying a locking mechanism which, in one position of the link member, is operative to lock the leadscrew device by preventing the position locating member from riding out of said hole and which, in another position of the link member, frees the position locating member to release the lock.

According to another aspect of the invention, leadscrew-positioned apparatus having an operation conditioned by its position comprises, in combination, a self-positioning leadscrew device by which the apparatus may be driven to any one of a plurality of preset positions along the leadscrew and which includes a locking mechanism by which the leadscrew device may be locked in a said position, a leadscrew device lock control link member connecting the locking mechanism and said apparatus and having a bias to a locked position from a free position in which it urges the locking mechanism towards the locked position whereby the leadscrew device becomes locked automatically when the apparatus reaches a said position, reset means for retaining the link member in a position intermediate the free and locked positions against the action of said bias and pending the further operation of the leadscrew device, first interlock means carried by the apparatus and sensitive to the position of the link member to permit the operation of said apparatus only when the leadscrew device is held locked by the link member, and second interlock means carried by the apparatus and sensitive to the position of the link member to permit the operation of the leadscrew device only when the apparatus is non-operative.

According to another aspect of the invention, electrical switchgear apparatus supported by a leadscrew device by which it may be elevated or lowered to occupy one of a plurality of fixed positions including a service position comprises a supporting base, a leadscrew having a vertical axis and mounted to be rotated about this axis by a mechanism located in the supporting base, a carriage supported by the leadscrew and including the driven threaded member of the leadscrew device, structural means restraining the carriage from rotation about the leadscrew axis, a housing system for the movable contacts and actuation mechanism of switchgear apparatus mounted on said carriage, a locking mechanism included in the carriage and operative to restrain the leadscrew automatically from further rotation when the carriage reaches a said position along the leadscrew, a leadscrew lock control link member connecting the locking mechanism with the actuation mechanism of the switchgear apparatus and interlock means in said housing system sensitive to the position of the leadscrew lock control link member and operative to permit the movement of the movable contacts towards the closed position only when the leadscrew is locked in a said fixed position whilst further permitting the rotation of the leadscrew only when the movable contacts are in the open position.

Features of the invention will be evident from the appended claims. These features relate to an automatic self-locking action of the leadscrew device, to the provision of means for adjusting a locking position to allow for accumulated manufacturing tolerance in an assembly incorporating the leadscrew device, and to the provision of means for conditioning the device to allow the automatic release of the lock when an attempt is made to turn the leadscrew.

The invention will now be described with reference to the accompanying drawings in which:

Fig. 4a shows a side elevation view of an adjustment feature of the leadscrew device of Fig. 1a, Fig. 4b shows a sectional elevation view of the adjustment feature taken on the section line 2—2 indicated in Fig. 1b.

Figure 1A:
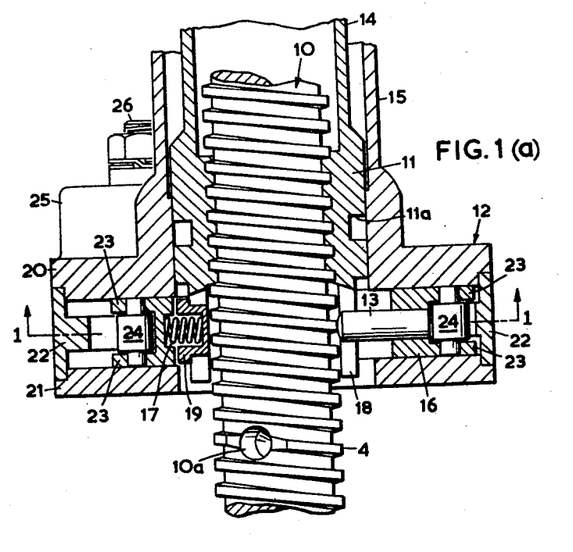
Fig. 1a shows a sectional side elevation view of a leadscrew device embodying the invention and shown in the reset position.
Figure 1B:
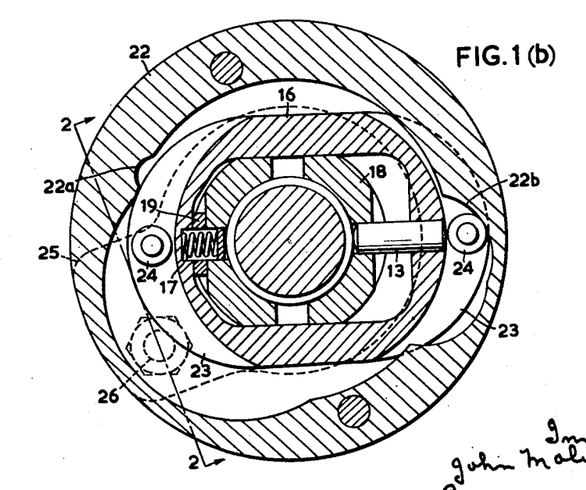
Fig. 1b is a view of the leadscrew device of Fig. 1a taken across the section 1—1.
Figure 4:
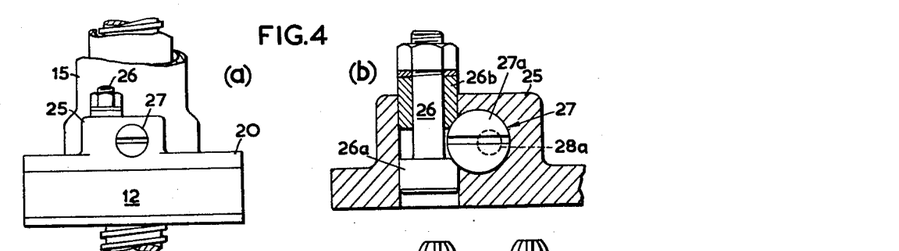

Referring now to Figs. 1a and 1b, the leadscrew device is shown to comprise a leadscrew 10, a screw nut 11 and a locking mechanism 12. Locking is effected by the insertion of a locking peg or tongue into a hole in the leadscrew. In the position of the leadscrew shown the hole 10a is some distance away from the tongue 13. The device is in the reset position which means that when the leadscrew is turned the device will become locked as soon as the hole 10a is brought into register with the tongue 13. The tongue 13 forms part of the locking mechanism 12 and the whole of this mechanism is carried by the screw nut 11. An adjustment means, not shown in Fig. 1, but to be described later with reference to Fig. 4, is provided for adjusting the relative positions of the screw nut 11 and the locking mechanism 12 in the direction of the leadscrew axis.

The screw nut 11 is formed at the end of the tubular member 14 which transmits a drive from the leadscrew device to some controlled structure. The locking mechanism 12 is designed so that the leadscrew is locked automatically when a certain position is reached, and as the locking mechanism must have some means for unlocking it, a lock control member in the form of a tube 15 is attached to the body of the locking mechanism and fits concentrically around the member 14, it being supposed that the release of the locking mechanism can be effected from some position remote from the screw nut and located near the structure driven by the member 14.

With the leadscrew device in the position shown in Fig. 1 a rotation of the leadscrew produces no consequential motion in the locking mechanism until the hole 10a reaches the tongue 13. Until this occurs the tongue 13 rides on the top of the screw thread on the leadscrew. The tongue 13 is formed as an inward projection on a slider ring 16 which is biased by the action of a spring 17 in a direction in which it urges the tongue 13 towards the leadscrew 10. The mounting for the slider ring 16 and a fixed seating for the spring 17 are provided by a bracket structure 18 formed at the end of screw nut 11. This bracket structure 18 is formed by a tubular extension on the end of the screw nut 11 and has four radial slots cut in its surface. One of these slots allows the tongue 13 on the slider ring 16 to have free access to the leadscrew. The slot opposite this is used to house a part of the spring 17 and a saddle 19 which forms a fixed seating for the spring. The other end of the spring is located in a recess in the slider ring 16. The configuration of the bracket structure 18 is symmetrical. The structure provides guide surfaces for the slider ring 16 permitting movement of this ring in a direction radial to the leadscrew axis but preventing the ring from rotating with the leadscrew. The symmetrical configuration of the structure 18 allows the slide ring 16, during assembly, to be inserted in one of four positions, as the tongue 13 may project through any of the slots in the structure. The saddle 19 can of course be positioned in any of these slots as required.

As so far described, the slider ring 16 is positively located by the action of the spring 17 which holds the tongue 13 against the leadscrew. The angular position of the slider ring is fixed by the bracket structure 18. Axial location is obtained by sandwiching the slider ring 16 between a flanged portion 20 formed at the end of the member 15 and an annular plate 21, which together with a collar member 22 form the body of the locking mechanism 12.

The inner surface of the collar 22 has a cam profile and the slider ring 16 has brackets 23 formed on opposite sides of it and carrying rollers 24 which, in certain positions of the leadscrew, run on the cam profile of the collar 22.

Figure 2:
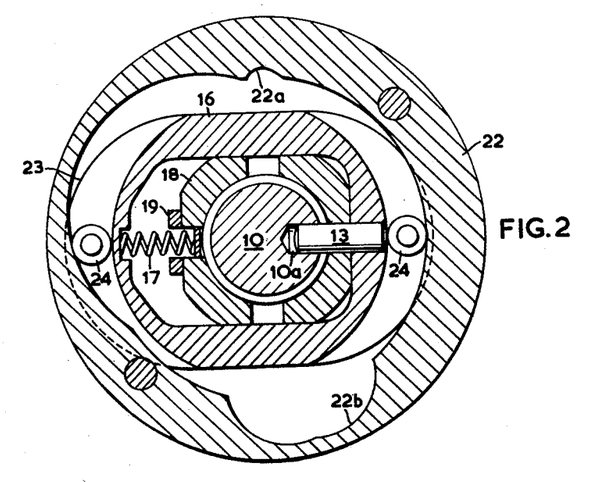
Fig. 2 is a view similar to that shown in Fig. 1b but with the leadscrew device in the locked position.
Figure 3:
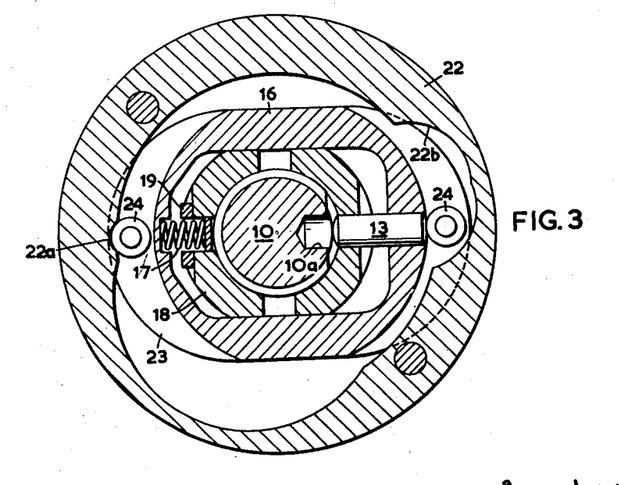
Fig. 3 is a view similar to that shown in Fig. 1b but with the leadscrew device in the free position.

Positions in which the action of the cam surface becomes operative are shown in Figs. 2 and 3. Fig. 2 shows the leadscrew device in the locked position, which is the position in which the hole 10a in the leadscrew has come into register with the tongue 13 to cause spring 17 to urge the tongue into the hole and so lock the leadscrew against further rotation. Reference to Fig. 1b will show that the slider ring 16 is free to move in the manner just indicated as the roller 24 on the spring side of the ring is some distance away from the cam surface of the collar 22. In Fig. 2 the slider ring 16 has moved to its fullest extent in the locking direction, the inside surface of the ring engaging the bracket structure 18 on three sides.

Before the leadscrew can re-operate it is necessary to release the locking mechanism. This involves displacing the slider ring against the bias action of the spring 17 and holding it so that the tongue 13 is clear of the hole 10a. Whilst holding this position the leadscrew must then be moved on before the slider ring 16 is released to reset the locking mechanism so that in the event of another hole such as the hole 10a being brought into register with the tongue 13, the leadscrew will lock automatically. As the operation of releasing the locking mechanism involves, as it were, three manipulations, that is (a) a releasing operation, (b) a movement of the leadscrew, and (c) a reset of the mechanism, it is possible for an inadvertent operator to forget to release the locking mechanism. In some applications this can be a distinct disadvantage and, at all events, it is undesirable for an operator to have to pause to reset the locking mechanism whilst manipulating the leadscrew.

The embodiment shown in the drawings includes provision for an automatic resetting action once the lock has been released and the leadscrew displaced. In the embodiment the lock is released by rotating the tubular member 15 about the leadscrew axis. This turns the collar from the position shown in Fig. 2 in a direction which is anti-clockwise as shown and owing to the cam profile causes the slider ring 16 to be displaced in a direction in which the tongue 13 is withdrawn from the hole 10a. With the collar 22 turned in this manner to a position in which the tongue 13 is clear of the hole in the leadscrew the lock has been freed and the leadscrew is free to turn. To provide an automatic resetting action provision is made to bias the member 15, and so the collar 22, in a particular angular direction. This direction is clockwise in the sense of the drawings presented in Fig. 1b, Fig. 2 and Fig. 3. Provision is also made to temporarily lock the collar 22 against rotation under the action of this bias until the leadscrew has been operated. The means for biasing the member 15 in the angular sense just mentioned are not shown in Figs. 1, 2 and 3 but will be mentioned with reference to Figs. 6 and 7 later. A small recess which receives the roller 24 and owing to the strong action of spring 17 is able to function as a lock strong enough to hold against the force of the spring bias on the member 15, is provided at 22a as shown. To release the lock the member 15 is turned to bring the recess 22a adjacent the roller 24 on the spring side of slider ring 16. The recess 22a is at just such a height on the cam surface of the collar 22 that the tip of the tongue 13, although just clear of the hole 10a, still lies in the angular path of the leadscrew 10. This is ensured by chamfering the mouth of the hole 10a or flattening the surface of the leadscrew adjacent the hole. With the leadscrew device in the free position shown in Fig. 3 an adjustment of the leadscrew 10 drives the tongue 13 out of the angular path of the leadscrew, displacing slider ring 16 against the bias action of spring 17 and withdrawing the roller 24, on the spring side of the ring from the recess 22a. Thus, by turning the leadscrew the tongue 13 is driven to the top of the thread on the leadscrew and thereafter rides on the top of this thread in a manner already indicated in Fig. 1, but at the same time, by virtue of the fact that the roller 24 has now come clear of the recess 22a the spring bias acting on the member 15 is free to move the body of the locking mechanism 12 back to the reset position shown in Fig. 1.

In certain applications it may be necessary to have a series of holes such as the hole 10a disposed along the leadscrew at accurately spaced positions. In these applications it may also be desirable to provide some form of adjustment should, in view of manufacturing tolerances in a mechanism driven by the leadscrew, the spacing of the holes not correspond with a predetermined spacing of locked positions. The leadscrew device shown in Figs. 1, 2 and 3 includes provision for effecting such an adjustment by altering the axial spacing of the screw nut 11 with respect to the body of the locking mechanism 12. Now, the axial position of a hole such as 10a is fixed with respect to the leadscrew thread and it is necessary that the axial position of the tongue 13 should correspond exactly to the position of the hole 10a when related to the thread on the screw nut 11. This means for example, that if the leadscrew has to be locked, say at a position which is a quarter of a turn from the locked position of the system shown in Fig. 1, the whole locking mechanism must turned through such an angle relative to the screw nut 11, and, at the same time, the axial spacing between the screw nut 11 and the locking mechanism 12 must be adjusted to keep the tongue 13 adjacent the top of the leadscrew thread 4.

As has been noted, the symmetrical configuration of the bracket structure 18 allows the slider ring 16 to be inserted during assembly in one of four positions. These positions are separated by angular distances corresponding to a quarter turn of the leadscrew 10. Thus, when during assembly the slider ring 16 is arranged with the tongue 13 fitting in one of the slots in the bracket structure 18, it is necessary to adjust the axial position of the nut 11 with respect to the body of the locking mechanism 12. The means for effecting this adjustment are shown in Fig. 4. Fig. 4a represents a side elevation view of the body of the locking mechanism 12 and shows at 25 a housing for a clamp bolt 26 and an eccentric adjustment device 27. The housing 25 is integral with the flanged portion 20 formed at the end of the member 15 (see Fig. 1a) and, as is shown in Fig. 4, the device 27 consists of a member 27a which fits in a hole in the housing 25 and has an eccentric projection 28a which fits closely within a slot 11a on the screw nut 11. This slot is shown more clearly in Fig. 1a. The axial position of the locking mechanism 12 with respect to the screw nut 11 is determined by the angular position of the member 27a with respect to the housing 25. This position can be adjusted by the use of a screw driver. The member 27a can be locked against rotation by a clamp bolt 26 which, when tightened, grips the surface of the member 27a between a tapered part of its head 26a and a boss 26b. Care must be taken in effecting the adjustment just described so that the slider ring 16 is not jammed when the mechanism is in the locked position.

A feature of the leadscrew device described is that provision can readily be incorporated for ensuring that information can be transmitted along the tube 15 to indicate to a controlling mechanism that the locking mechanism is in fact in the locked position. When the leadscrew reaches a position in which the tongue 13 can slide into a hole 10a under the action of spring 17 the leadscrew becomes locked. To afford an indication that the leadscrew is in fact locked the spring bias action on the collar 22 can be applied to turn the collar around to such a position that the lock is ensured. Reference to Fig. 2 will show that the collar 22 has moved through an angle compared with its position as indicated in Fig. 1b. The action of a spring bias on the collar 22 has already been mentioned wtih regard to the function of the recess 22a. It was said that the collar was biased in a clockwise direction so that when the leadscrew was turned and the tongue 13 driven out of the path of the leadscrew, a roller 24 disengaged the recess 22a and allowed the collar 22 to turn clockwise from the position shown in Fig. 3 to that shown in Fig. 1b. The clockwise movement of the collar 22 is arrested by the engagement of the cam profile of the collar with the roller 24 on the tongue side of the ring 16. In this position the roller is in a rather large recess 22b of the cam surface. As soon as the locked position is reached the roller 24 moves radially inwards with the tongue 13 and the spring bias action of the collar 22 is therefore able to turn the collar 22 further clockwise, bringing the cam profile past the roller 24 which ensures that the tongue 13 must remain in the hole 10a. Thus, when the leadscrew 10 reaches the locked position and is in fact locked under the action of the spring 17 the collar 22 and so the tube 15 move through an angle and provide an additional lock independent of the spring 17. It is this motion which is transmitted to a controlling mechanism so as to provide an indication that the leadscrew has reached a locked position and, as has been described, it is only when the tube 15 and the collar 22 are turned in the opposite direction against the bias action of the spring that the leadscrew device is freed.

The occasion frequently arises particularly on metal clad switchgear where it is necessary to actuate a motion by means of a leadscrew, to lock the motion at the completion of its travel, and to convey a signal that the motion has been completed to an associated mechanism. Examples are to be found in the operation of an off-load busbar selector switch interlocked with a circuit breaker closing mechanism or the isolating motion of a moving portion interlocked with a circuit breaker closing mechanism.

A particular application of the leadscrew device to a vertical isolation metal clad switch unit will now be described.

In the particular case of a vertical isolation metal clad switch unit it is necessary to elevate the movable portion of the unit to the "service," "earthed" and "maintenance" positions, to lock the moving portion at these positions and to permit the closing mechanism to operate only at these positions. This elevation is commonly carried out by one or more leadscrew devices and locking is normally effected by the use of one or more bolts connected to the closing mechanism. In the past the disposition of the bolts and the related structure made them prone to damage owing to direct forces transmitted with mechanical advantage through the leadscrew, and unless the bolts and related locations were exposed to view, location was a matter of trial and error. Furthermore, if, as is often the case, some adjustment is required in these locations to compensate for possible accumulations of manufacturing tolerance in the assembly of the moving portion, difficulties are encountered which are both cumbersome and expensive to overcome. These difficulties may be remedied by utilizing the leadscrew device provided by this invention.

Figure 5:
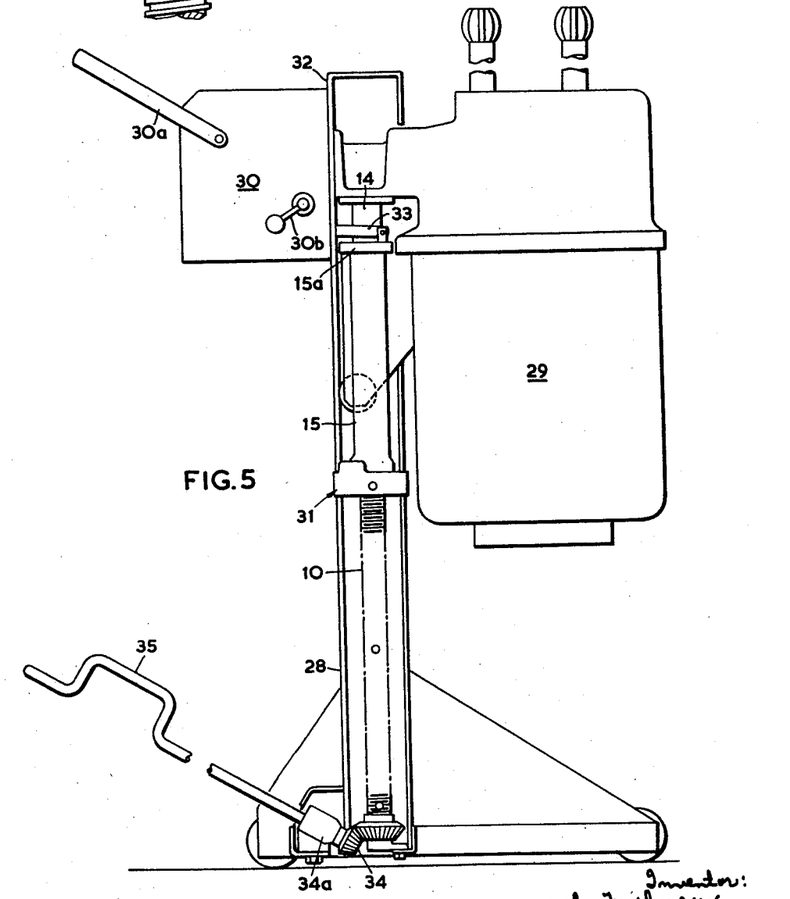
Fig. 5 shows a side elevation view of a truck mounted electrical switchgear unit in which the leadscrew device shown in the preceding figures is used as a jack to raise or lower the electrical parts of the switch between an operative and a maintenance position.

Fig. 5 shows schematically a side elevation view of a metal clad switch unit having the form just described but provided with a leadscrew device utilizing the invention. The unit consists of a truck mounted frame structure 28, a contact carrying unit 29, an actuating and trip unit 30, and leadscrew mechanism 31. The unit is shown in the fully elevated position which is the service position. The contact carrying unit 29 and actuating and trip unit 30 are disposed one on either side of a panel 32 which forms a part of the frame structure 28. They are assembled integral with the screw nut 11 of the leadscrew mechanism, having the form shown in Figs. 1, 2, 3 and 4. The screw nut 11 is not shown in Fig. 5, but is connected integral with the contact carrying unit 29 and actuating and trip unit 30 by the member 14. The tube 15, whose function is to control the locking mechanism of the leadscrew mechanism 31 is connected at its top end to the actuating trip unit 30 by a linkage member 33.

Gearing is provided at 34 to operate the leadscrew 10. An operating handle 35 has to be inserted in a socket 34a at the base of the truck in order to turn the leadscrew.

Figure 6:
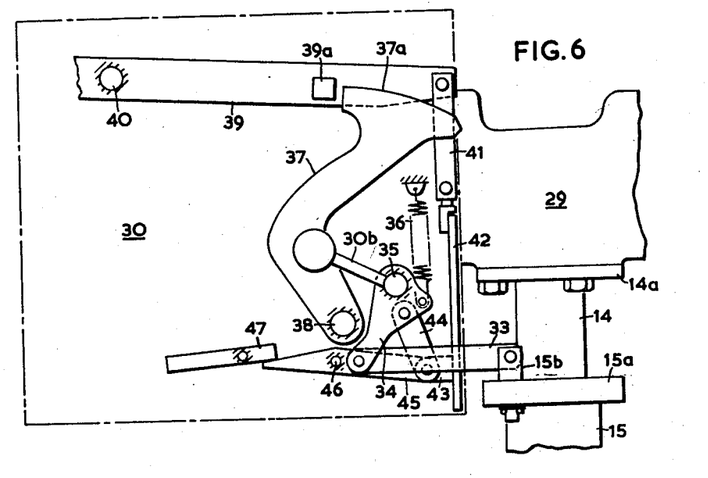
Fig. 6 shows an interlock mechanism used in the switchgear shown in Fig. 5, the lock release handle of the leadscrew device being in the free position.
Figure 7:
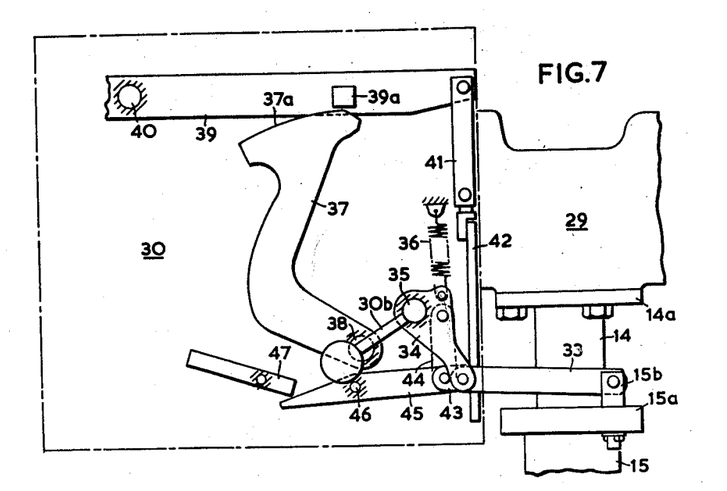
Fig. 7 shows the interlock mechanism of Fig. 6 with the lock release handle in the locked position.

In operation, the switch unit is required to be able to close only in certain locked positions. The position of the unit shown in Fig. 5 is one of these positions. Such operation is possible by an actuating handle shown schematically at 30a. When it is required to lower the contact carrying unit to an earthed or maintenance position it is necessary to release the locking mechanism of the leadscrew. The handle shown schematically at 30b is provided for this purpose. This handle is connected in some way with the linkage member 33. Thus the handle 30b is manipulated to free the lock of the leadscrew. In the event that the switch is closed when this is done it is necessary to ensure that some interlock exists which will ensure that the leadscrew cannot be turned until the contacts of the switch have in fact opened. The manipulation of the handle 30b frees the locking mechanism. It is to be noted that an interlock is provided which ensures that the handle 30b cannot be raised until the switch contacts are open, the opening of these contacts being achieved either by electrical tripping or by the use of a separate manual trip button provided for the purpose. (These means for opening the switch contacts are not shown in the accompanying drawings.) To lower the unit 29 the operating handle 35 must be inserted in the socket 34a and the leadscrew operated in the appropriate sense. Immediately the leadscrew is turned the resetting action of the locking mechanism takes place in the manner described and when the unit 29 has been lowered sufficiently the tongue 13 in the locking mechanism is brought into register with another hole in the leadscrew and the leadscrew becomes immediately locked. It is to be noted that some interlock means are required to ensure that the switch cannot be closed whilst the leadscrew is between its locked positions. It is only when the leadscrew has reached a locked position that closure of the switch may take place. The detailed mechanism necessary to ensure the various interlocks just described is shown in Figs. 6 and 7. It is contained in the actuating and trip unit 30.

In an application of the leadscrew mechanism in the manner shown in Fig. 5, it is most important that the service position of the leadscrew should be accurately determined as this position determines the relative positions of the isolating contacts. The need for the locked position adjustment described with reference to Fig. 4 is particularly important with regard to this one locked position.

The mechanism necessary to perform the interlock between the actuating and trip unit 30 and the leadscrew mechanism is shown schematically in Figs. 6 and 7. The tube 15 is shown to have a flanged portion 15a at its top end, and close to the periphery of this flanged portion there is a bracket 15b which is pivotally connected to a link member which corresponds to the member 33 shown in Fig. 5. The purpose of this pivotal connection between the member 33 and the tube 15 is merely to convert a translational movement of the member 33 into a rotational movement of the tube 15. The member 33 is pivotally connected at its other end to an actuating lever 34 which is pivotally mounted on a pivot 35 rigidly located within the actuating and trip unit 30 indicated schematically by the broken rectangle. The handle 30b already mentioned is integral with the actuating lever 34 and accordingly a manipulation of this handle transmits a motion to the tube 15 to exercise a control to the leadscrew locking mechanism. In the sense shown in the drawing a spring 36 is arranged to bias the actuating lever 34 in an anticlockwise direction. This bias is transmitted through the linkage mechanism to the tube 15 and provides the bias already mentioned in describing the function of the cam profile on the collar 22.

In the foregoing description with reference to Figs. 1, 2 and 3 the tube 15 occupies one of three alternative positions. In one of these positions, the locked position, the tube 15 has one extreme angular position. In Fig 7 the tube 15 is in the locked position. The other extreme position is the free position and this is shown in Fig. 6, and between these two positions there is the reset position. In a cycle of operation the tube 15 moves automatically from the free position to the reset position and from the reset position to the locked position. Some external control is necessary to move it from the locked position to the free position and this control is provided by manipulating the handle 30b, moving it from the position shown in Fig. 7 to that shown in Fig. 6. It is necessary that the lock of the leadscrew mechanism should only be freed if the switch is in the open position. Accordingly, an interlock is provided in the systems shown in Figs. 6 and 7 which prevents the handle 30b from being raised if the switch is closed.

This interlock is provided through a linkage mechanism governed by the position of a draw lever 37 which is connected to the switch contacts. For the purpose of this description the position of the draw lever shown in Fig. 6 corresponds to the contacts being open, whereas that shown in Fig. 7 corresponds to the contacts being closed. The draw lever pivots about a pivot 38 which is fixed in position relative to the unit 30. The draw lever has a part-circular surface 37a which is able to engage a stop 39a on a link member 39 which is pivoted at one end about a fixed pivot 40. The other end of the link member 39 is connected through a linkage 41 to a member 42 which carries a bracket 43. A link 44 which is pivotally connected at both its ends connects the actuating lever 34 with bracket 43. A trip actuating lever 45 which is centrally pivoted on a pivot 46 fixed in the unit 30 co-operates at one end with a trip mechanism 47 and is pivotally connected at its other end to bracket 43. The relative dispositions of the various members will be apparent from Figs. 6 and 7. It will be seen that for any given position of the actuating lever 34 the position of the various members 39, 41, 42 and 45 are uniquely determined. When the handle 30b is in the position shown in Fig. 7 the link member 44 has been lifted to an extreme position resulting in members 41 and 42 having moved upwards and member 39 and lever 45 having moved anticlockwise. In this position the stop 39a on the member 39 is lifted clear of the draw lever path and this draw lever is free to move so that the switch may be closed or opened as required when the linkage system has the position shown in Fig. 7. It follows, therefore, that when the locking mechanism is in a locked position the switch can be operated. However, when the handle 30b is in the position shown in Fig. 6, the link member 44 is in its lowest position and the stop 39a has moved downwards. It can only do this if the draw lever has the position shown in Fig. 6, that is if the switch is open.

In the intermediate position of the tube 15, that is the reset position, it is necessary that the draw lever 37 should be locked so as to prevent the switch from closing. Also, as the movement of the leadscrew locking mechanism from the free position to the reset position occurs automatically as the leadscrew is manipulated an unwanted motion is applied to the linkage mechanism and it is desirable that this mechanism should be designed so that the effect of this motion, in so far as it is transmitted to the lever 45 and the member 39, is mitigated. In the schematic arrangement of the linkage mechanism shown in Figs. 6 and 7 this latter feature is assured by arranging that the pivot 35 should lie in the axis joining the end pivots of the link member 44 when the locking mechanism is in or close to the free position. In this position, as will be seen from Fig. 6, small angular movements of the actuating lever 34 have little effect in drawing the bracket 43 towards the pivot 35 and accordingly little vertical motion is transmitted to the members 41 and 42. The link member 44 as a means for connecting the actuating lever 34 with the members 39, 41, 42 and the lever 45 therefore constitutes a desirable feature of the embodiment shown.

The mechanism shown in Fig. 6 and Fig. 7 therefore fulfils the necessary functions of ensuring that the switch can only be closed when the leadscrew mechanism has reached a locked position, that the leadscrew remains locked until the switch is opened, and that once the leadscrew mechanism has been freed or the leadscrew manipulated so that its mechanism is in the reset position the switch cannot be closed.

In describing the means for adjusting a locked position of the leadscrew relative to the screw nut, it will be noted that the relative angular adjustment of the tube 15 with respect to a member 14 is necessary. A preferred method of making an angular adjustment of the tube 15 in the linkage system shown in Figs. 6 and 7 involves the provision of four symmetrically spaced holes in the flange 15a. The bracket 15b may then take the form of a swivel cleavage which can be inserted through any of the four holes and secured by a split pin after tube 15 has been correctly positioned. It is therefore a simple matter during assembly to attach bracket 15b to the tube 15 at any angular position separated by an integral number of quarter turns from a fixed datum. In effect, for a given locked position of the leadscrew mechanism this enables the height of the unit 29 to be adjusted to within one eighth of a leadscrew thread pitch which is sufficient in the application described.

Whereas in the embodiment of the locking mechanism of the leadscrew described with reference to Figs. 1, 2 and 3 the recess 22a in the cam profile of the collar 22 is provided to locate the roller 24 and to temporarily lock the collar 22 and so the tube 15 against rotation under the action of a spring bias, it may be preferable in some circumstances to utilize a spring catch in place of the locating recess 22a. This spring catch could be built into the cam profile of the collar 22 and would be so designed that a more gradual slope would be provided on the cam adjacent the catch so as to allow easier withdrawal of the slider ring 16. This would also facilitate the shaping of the cam profile to allow a reduced rotation of the tube 15 in moving from the free position to the reset position of the locking mechanism.

It will also be understood that the basic principles underlying the invention can be embodied in many simpler arrangements of leadscrew mechanism especially if a non-automatic operation is used.

In order to lock in the open position a switch actuation mechanism of the form shown in Figs. 6 and 7, it is preferable to dislodge a tripping member so that if a spring closing device is released the draw lever 37 is not jammed. The dislodged tripping member, in this case the trip mechanism 47, may function to allow the mechanism to "collapse" with the result that if the spring closing device is released the spring charge will simply "fire free." This will serve to explain the function of the trip mechanism shown in the drawings, its function being independent of the invention claimed.

What I claim as my invention and desire to secure by Letters Patent, is:

1. A position locking leadscrew device comprising a leadscrew, a co-operating screw nut threaded on the leadscrew, a structure in which one of these members is rotatably mounted and by which the other is restrained from rotation, a position locating member carried by the screw nut and formed by a movable tongue which is admitted to a mating hole in the leadscrew when this hole comes into register with the tongue but which can ride out of the hole when there is angular movement between the leadscrew and the nut, and a lock control link member mounted in said structure and carrying a locking mechanism which, in one position of the link member, is operative to lock the leadscrew device by preventing the position locating member from riding out of said hole and which, in another position of the link member, frees the position locating member to release the lock.

2. A self-positioning self-locking leadscrew device comprising a leadscrew, a co-operating screw nut threaded on the leadscrew, a structure in which one of these members is rotatably mounted and by which the other is restrained from rotation, a position locating member carried by the screw nut and formed by a movable tongue which is admitted to a mating hole in the leadscrew when this hole comes into register with the tongue but which can ride out of the hole when there is angular movement between the leadscrew and the nut, a lock control link member mounted in said structure and carrying a locking mechanism which, in one position of the link member, is operative to lock the leadscrew device by preventing the position locating member from riding out of said hole and which, in another position of the link member, frees the position locating member to release the lock, and bias means mounted between said structure and said link member acting to bias this link member towards its first-mentioned position whereby the leadscrew device will become locked automatically when the movable tongue comes into register with the hole in the leadscrew.

3. A position locking leadscrew device comprising a mounting, a leadscrew rotatably supported by the mounting, a co-operating screw nut threaded on the leadscrew, a structure rigidly connected to said screw nut by an elongated connecting member positioned parallel with the leadscrew axis, connection means between said structure and said mounting operative to restrain the screw nut from rotation whilst permitting movement of the nut and said structure relative to the leadscrew in the direction of the leadscrew axis, a position locating member carried by the screw nut and formed by a movable tongue which is admitted to a mating hole in the leadscrew when this hole comes into register with the tongue but which can ride out of the hole when the leadscrew is rotated, a lock control link member mounted in said structure and formed by a tubular housing which encloses said elongated connecting member and a part of the leadscrew, and a locking mechanism carried by said link member and which, in one position of the link member, is operative to lock the leadscrew device by preventing the position locating member from riding out of said hole and which, in another position of the link member, frees the position locating member to release the lock.

4. A self-positioning self-locking leadscrew device comprising a mounting, a leadscrew rotatably supported by the mounting, a co-operating screw nut threaded on the leadscrew, a structure rigidly connected to said screw nut by an elongated connecting member positioned parallel with the leadscrew axis, connection means between said structure and said mounting operative to restrain the screw nut from rotation whilst permitting movement of the nut and said structure relative to the leadscrew in the direction of the leadscrew axis, a position locating member carried by the screw nut and formed by a movable tongue which is admitted to a mating hole in the leadscrew when this hole comes into register with the tongue but which can ride out of the hole when the leadscrew is rotated, a lock control link member mounted in said structure and formed by a tubular housing which is concentric with and pivotally mounted to turn about the leadscrew axis and which encloses said elongated connecting member and a part of the leadscrew, a locking mechanism carried by said link member and which, in one angular position of the housing, is operative to lock the leadscrew device by preventing the position locating member from riding out of said hole and which, in another angular position of the housing, frees the position locating member to release the lock, and spring bias means connected between said structure and said housing acting to bias the housing towards its first-mentioned angular position whereby the leadscrew device will become locked automatically when the movable tongue comes into register with the hole in the leadscrew.

5. A self-positioning leadscrew locking device comprising a leadscrew, a co-operating screw nut threaded on the leadscrew, a structure in which the leadscrew is rotatably mounted and by which the screw nut is restrained from rotation, a ring which fits loosely around the leadscrew and which is supported relative to the screw nut to be restrained from rotation about the leadscrew axis, to have a positive location along said axis relative to the nut and further to be capable of lateral movement transverse to said axis, a bias spring acting on the ring and positioned to oppose this lateral movement, a radially-inward projection on the ring which forms a tongue which is admitted automatically under the action of the bias spring to a mating hole in the leadscrew when this hole comes into register with the tongue but which can ride out of the hole against the action of the bias spring when the leadscrew is rotated, and a lock control link member mounted in said structure and carrying a locking mechanism which, in one position of the link member, is operative to lock the leadscrew device by preventing the position locating member from riding out of said hole and which, in another position of the link member, frees the position locating member to release the lock.

6. A self-positioning leadscrew locking device according to claim 5, wherein the tongued ring has parallel guide surfaces on the inner part of the ring which co-operate with corresponding guide surfaces on the outer part of the screw nut, whereby it is adapted to be capable of said lateral movement with respect to the leadscrew axis whilst being restrained from rotating about this axis, and said outer part of the screw nut has an even number of guide surfaces which form a polygon, opposite sides of which are parallel, whereby said ring can be assembled in the locking mechanism so that any pair of said guide surfaces on the screw nut may function as such to restrain relative angular movement between the ring and the nut whilst allowing relative movement in a direction transverse to the leadscrew axis.

7. A self-positioning leadscrew locking device according to claim 6, wherein the outer part of the screw nut is square, whereby it is possible to ensure an adjustment of the presetting of the locking mechanism which need be in error by no more than an eighth of a thread pitch.

8. A self-positioning leadscrew locking device according to claim 6, which further comprises means for enabling the axial location of the ring with respect to the nut to be adjusted during the assembly of the mechanism.

9. A self-positioning leadscrew locking device comprising a leadscrew, a co-operating screw nut threaded on the leadscrew, a structure in which the leadscrew is rotatably mounted and by which the screw nut is restrained from rotation, a ring which fits loosely around the leadscrew and which is supported relative to the screw nut to be restrained from rotation about the leadscrew axis, to have a positive location along said axis relative to the nut and further to be capable of lateral movement transverse to said axis, a bias spring acting on the ring and positioned to oppose this lateral movement, a radially-inward projection on the ring which forms a tongue which is admitted automatically under the action of the bias spring to a mating hole in the leadscrew when this hole comes into register with the tongue but which can ride out of the hole against the action of the bias spring when the leadscrew is rotated, and a lock control link member carrying a collar which fits around the ring and is pivotally mounted so as to turn about the leadscrew axis, the angular position of this collar with respect to that of the screw nut determining a limit of said lateral movement by the action of a cam-shaped engaging surface between the ring and the collar, whereby to provide a locking action by which, in one position of the link member the collar retains the ring with the tongue held in the hole in the leadscrew so locking the leadscrew device, and in another position of the link member the collar does not restrain the ring from moving to free the lock.

10. A self-positioning leadscrew locking device according to claim 9, wherein said lock control link member is attached at one end to said collar and is capable of transmitting a torque about the leadscrew axis to effect an angular adjustment of said cam-shaped engaging surface about this axis to control the leadscrew locking action.

11. A self-positioning self-locking leadscrew device according to claim 9, wherein means are provided for biasing the collar in an angular sense about the leadscrew axis and wherein there is a recess in the cam-shaped surface co-operating with a cam follower on the ring to provide an interlock which prevents the collar from rotation relative to the screw nut but which is released automatically as the leadscrew is turned, the recess being at a part in the cam profile at which the leadscrew lock is free, at which position the tongue on the ring projects into the angular path of the leadscrew but is clear from the tongue-mating recess in the leadscrew because this latter recess is chamfered or in a flattened part of the leadscrew, whereby rotation of the leadscrew pushes the tongue out of the angular path of the leadscrew causing the tongue to ride on the top of the thread and move the ring with it, thus carrying the cam follower clear of the recess in the cam profile and resetting the locking mechanism so that it may relock automatically.

12. Leadscrew-positioned apparatus having an operation conditioned by its position and comprising, in combination, a self-positioning leadscrew device by which the apparatus may be driven to any one of a plurality of preset positions along the leadscrew and which includes a locking mechanism by which the leadscrew device may be locked in a said position, a leadscrew device lock control link member connecting the locking mechanism and said apparatus and having a bias to a locked position from a free position in which it urges the locking mechanism towards the locked position whereby the leadscrew device becomes locked automatically when the apparatus reaches a said position, reset means for retaining the link member in a position intermediate the free and locked positions against the action of said bias and pending the further operation of the leadscrew device, first interlock means carried by the apparatus and sensitive to the position of the link member to permit the operation of said apparatus only when the leadscrew device is held locked by the link member, and second interlock means carried by the apparatus and sensitive to the position of the link member to permit the operation of the leadscrew device only when the apparatus is non-operative.

13. Leadscrew-positioned apparatus according to claim 12, wherein said second interlock means prevents the re-setting of the reset means unless the apparatus is non-operative whereby the locking mechanism remains locked until the apparatus is rendered non-operative and the system reset, after which the leadscrew device can be operated to re-position the apparatus.

14. Electrical switchgear apparatus supported by a leadscrew device by which it may be elevated or lowered to occupy one of a plurality of fixed positions including a service position and comprising a supporting base, a leadscrew having a vertical axis and mounted to be rotated about this axis by a mechanism located in the supporting base, a carriage supported by the leadscrew and including the driven threaded member of the leadscrew device, structural means restraining the carriage from rotation about the leadscrew axis, a housing system for the movable contacts and actuation mechanism of switchgear apparatus mounted on said carriage, a locking mechanism included in the carriage and operative to restrain the leadscrew automatically from further rotation when the carriage reaches a said position along the leadscrew, a leadscrew lock control link member connecting the locking mechanism with the actuation mechanism of the switchgear apparatus and interlock means in said housing system sensitive to the position of the leadscrew lock control link member and operative to permit the movement of the movable contacts towards the closed position only when the leadscrew is locked in a said fixed position whilst further permitting the rotation of the leadscrew only when the movable contacts are in the open position.

References Cited in the file of this patent

UNITED STATES PATENTS

| | | |
|---|---|---|
| 1,153,697 | Leland | Sept. 14, 1915 |
| 1,570,730 | De Lano | Jan. 26, 1926 |
| 1,763,144 | Fuller | June 10, 1930 |
| 2,594,605 | Zoppelt | Apr. 29, 1952 |
| 2,716,352 | Wilson | Aug. 20, 1955 |